United States Patent [19]

Keller et al.

[11] 4,408,551
[45] Oct. 11, 1983

[54] ROW PLANTER

[75] Inventors: Phillip D. Keller, Fort Collins; Oren D. Urich, Windsor, both of Colo.; Deroy E. Mahagan, Everett, Wash.

[73] Assignee: Heath Farm Equipment, Ft. Collins, Colo.

[21] Appl. No.: 301,640

[22] Filed: Sep. 14, 1981

[51] Int. Cl.³ ................................................. A01C 5/06
[52] U.S. Cl. ........................................ 111/85; 111/87; 172/175; 172/180; 172/536
[58] Field of Search .................................. 111/83–88, 111/52; 172/519, 536, 537–539, 180, 182, 183, 174, 175, 558, 561, 562

[56] References Cited

U.S. PATENT DOCUMENTS

| | | | |
|---|---|---|---|
| 237,278 | 2/1881 | Hoflund | 111/87 X |
| 398,459 | 2/1889 | Sheridan | 111/52 WT |
| 607,964 | 7/1898 | Stamper | 111/87 X |
| 666,922 | 1/1901 | Desjardins | 111/87 |
| 667,043 | 1/1901 | Steep | 111/84 |
| 815,451 | 3/1906 | Mayhew | 111/87 X |
| 1,012,118 | 12/1911 | Aspinwall | 111/87 X |
| 1,284,589 | 11/1918 | Campbell | 111/87 |
| 1,416,331 | 5/1922 | Campbell | 111/87 |
| 1,747,525 | 2/1930 | Nagy | 111/85 X |
| 1,888,128 | 11/1932 | Hester | 172/429 X |
| 2,106,901 | 2/1938 | Rassmann | 111/88 |
| 2,332,012 | 10/1943 | Rassmussen | 172/536 |
| 2,685,243 | 8/1954 | Cole | 172/536 X |
| 3,217,674 | 11/1965 | Williams | 111/86 |
| 3,499,495 | 3/1970 | Pust | 172/536 |
| 4,009,668 | 3/1977 | Brass et al. | 111/85 |
| 4,141,302 | 2/1979 | Morrison et al. | 111/52 |
| 4,331,205 | 5/1982 | Sorenson et al. | 111/85 X |

FOREIGN PATENT DOCUMENTS

| | | | |
|---|---|---|---|
| 497664 | 12/1950 | Belgium | 172/536 |
| 2409676 | 6/1979 | France | 111/85 |
| 257807 | 3/1928 | Italy | 111/87 |

*Primary Examiner*—James R. Feyrer
*Attorney, Agent, or Firm*—W. Scott Carson

[57] ABSTRACT

A row planter having an improved opening means preferably used in combination with a furrow forming shoe. The opening means includes an unitary, disc means mounted for rotation about a horizontal axis and the shoe is mounted so that a peripheral portion thereof overlaps and substantially abuts a peripheral portion of the disc means. The overlapping peripheral portion of the shoe serves to clean the peripheral portion of the disc means and will continue to do so even as the disc means wears down and its diameter begins to diminish. In the preferred embodiment, the overlapping peripheral portion of the shoe is proportioned and mounted so that its profile when viewed from ahead of the row planter falls within the profile of the disc means. In this manner, there is a smooth transition between the furrow opening disc means and the furrow forming shoe. Outwardly of the disc means are positioned depth gauge wheels which are eccentrically mounted relative to the horizontal axis of the disc means. The disc means and depth gauge wheels are mounted on a common support means. To adjust the depth of the row planter, the depth gauge wheels are pivoted in unison along arcuate paths about the horizontal axis of the disc means using a control mechanism positioned outwardly of the depth gauge wheels for easy and quick access.

20 Claims, 8 Drawing Figures

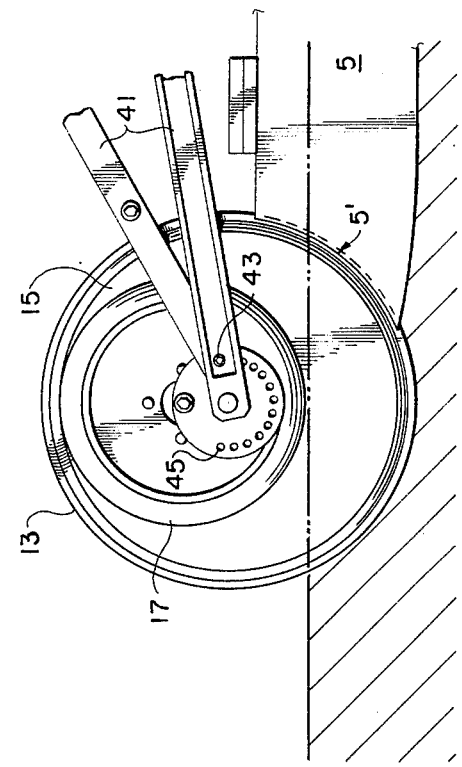
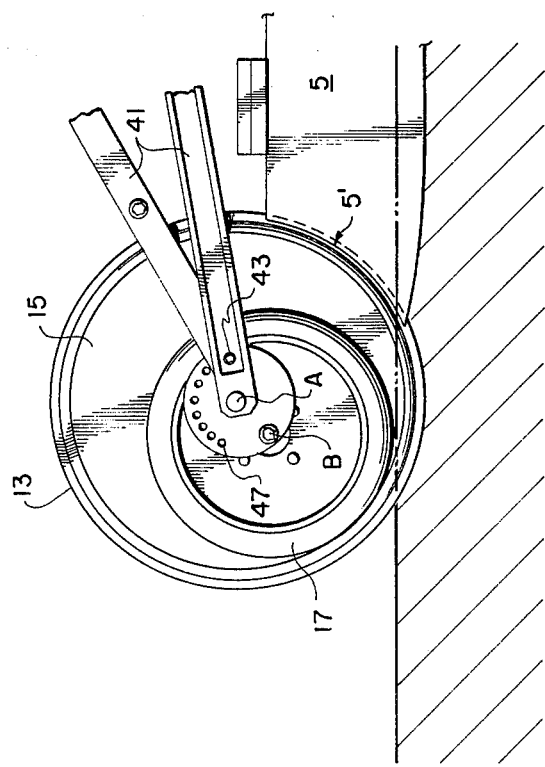

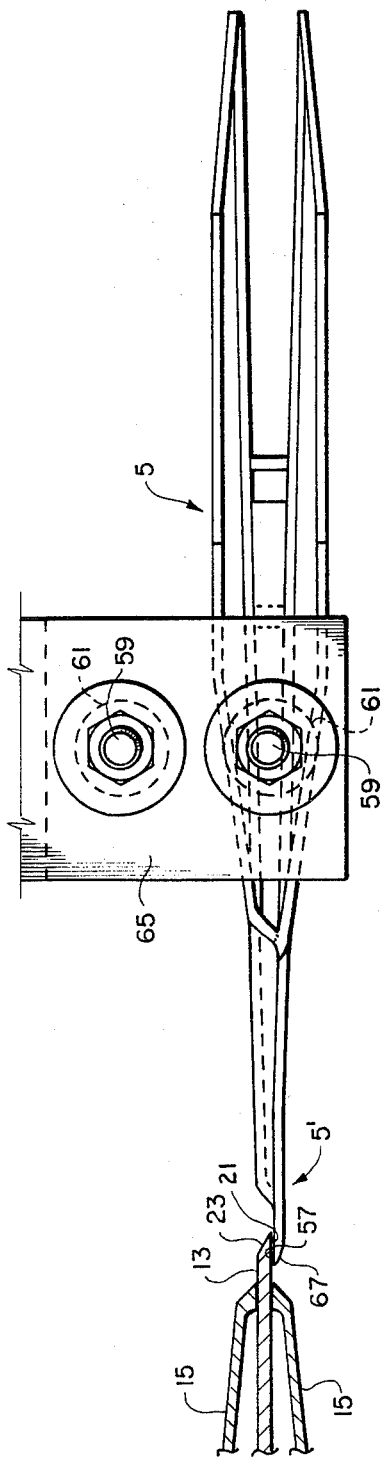
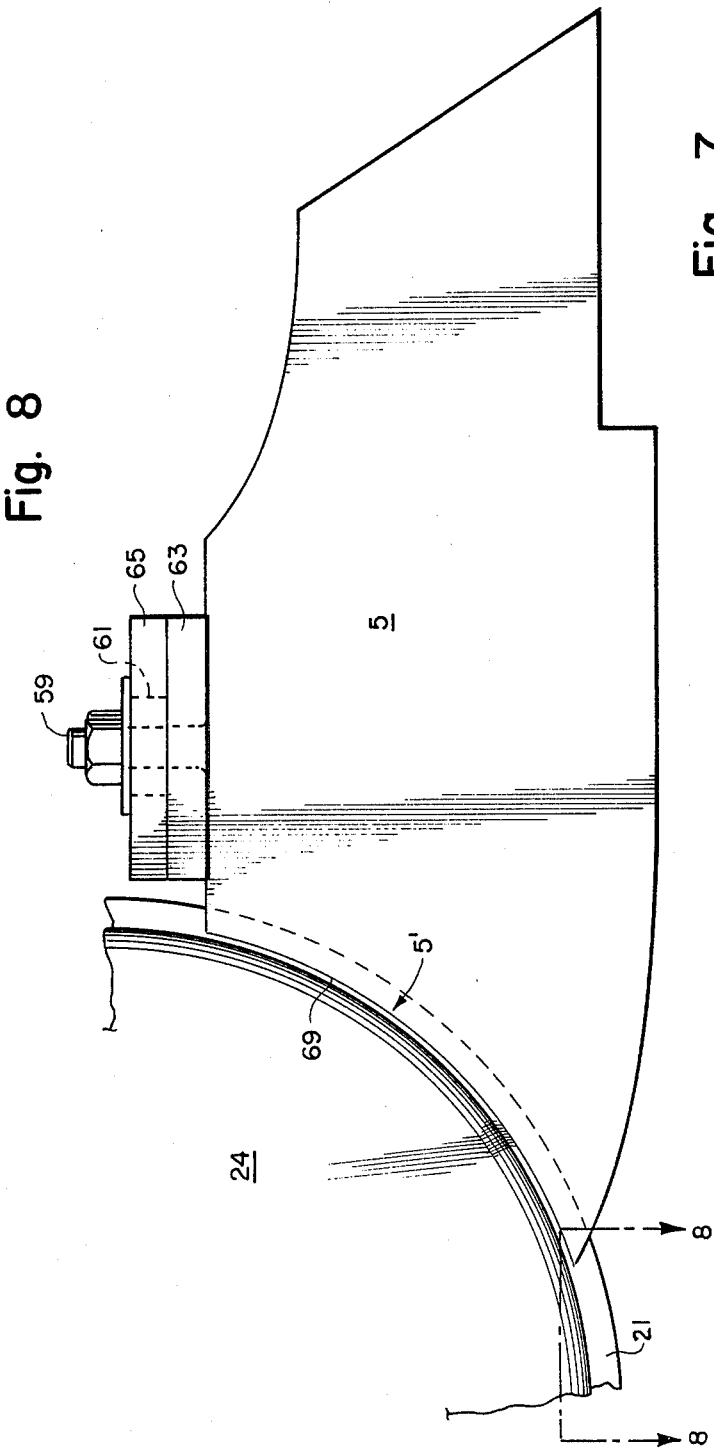
Fig. 8
Fig. 7

ROW PLANTER

FIELD OF THE INVENTION

This invention relates to the field of row planters and more particularly to the field of row planters which use rotating discs to initially open the furrow and shoes to actually form the furrow prior to the seed drop.

BACKGROUND OF THE INVENTION

Row planters are commonly used throughout the world for planting a wide variety of seeds under a wide variety of soil conditions. Typically, row planters perform the steps of initially opening the furrow which often includes trash cutting (i.e., old stalks, roots, stubble), forming the furrow, dropping the seed into the furrow, and then covering the seed with soil. Each of these steps can be accomplished in a number of ways using an almost infinite variety of structures and combinations of structures. Other steps such as fertilizing can be included in the row planter and in some instances, the same structure can be used to perform two or more of the basic steps outlined above.

Among the more desirable characteristics of a row planter are uniform operation particularly as its relates to seed planting, depth and spacing and the ease and accuracy with which the depth of the furrow can be adjusted to meet differing soil conditions and to adapt the row planter for use with different seeds. It was with these particular traits of uniform operation and ease and accuracy of furrow depth adjustment in mind that the present invention was developed and particularly adapted to row planters which use rotating discs to initially open the furrow and shoes to complete the formation of the furrow.

SUMMARY OF THE INVENTION

This invention involves a row planter. In the preferred embodiment, the row planter has a unitary, disc-shaped opening means followed by a furrow forming shoe. The disc means is mounted for rotation about a horizontal axis perpendicular to the direction of travel of the row planter and the shoe is mounted so that a peripheral portion thereof overlaps and substantially abuts one side of the disc means. In this manner, the overlapping peripheral portion of the shoe serves to scrape off any dirt or other matter on the one side of the disc means and will continue to do so even as the disc means wears down and its diameter begins to diminish. Also, the overlapping relationship enables the disc means and shoe to be more easily aligned in their proper position as they can be first physically moved together until they abut and then moved apart a predetermined amount until the disc means rotates freely. As another design feature, the overlapping peripheral portion of the shoe is proportioned and mounted so that its profile when viewed from ahead of the row planter falls within the profile of th disc means. In this manner, there is a smooth transition between the furrow opening disc means and the furrow forming shoe.

The unitary, furrow opening disc means of the present invention is preferably used in combination with a furrow forming shoe; however, it can also be used by itself to form a furrow. In either use, the disc means is actually composed of a disc-shaped, trash cutter member positioned between two other disc-shaped members. The trash cutting member is of larger diameter than the other disc-shaped members and an annular portion of it protrudes outwardly beyond them. This annular portion has first and second planar surfaces which are perpendicular to the axis of rotation of the trash cutting member. In the preferred embodiment, these two surfaces extend outwardly of the rotational axis for different distances and there is an inclined surface extending between them to form a unique, single bevel on the periphery of the trash cutting member. When used in combination with the shoe, the larger of the two parellel surfaces abuts against the shoe to create the scraping action discussed above. In the preferred embodiment, the shoe additionally has a single bevel which is spaced from and substantially parallel to the single bevel of the trash cutting member. When the furrow opening disc means is used alone without a following shoe, it also becomes a furrow forming means in that the two disc-shaped members which abut the trash cutting member also diverge away from the annular portion of the trash cutting member. In this manner, the outer two disc-shaped members actually become furrow forming means themselves.

The depth control for the furrow opening disc means (whether used in combination with a shoe or alone) includes a pair of depth gauge wheels. The depth gauge wheels are respectively supported outwardly of the two disc-shaped members and are mounted for rotation about axes different from the axis of rotation of the disc means and fixed in relation thereto. The depth gauge wheels are circular and are preferably mounted within the circular periphery of the disc means and positioned asymmetrically relative to the rotational axis of the disc means. To adjust the deth of the furrow opening disc means, the depth gauge wheels are pivoted in unison along arcuate paths about the rotational axis of the disc means. In this manner, more or less of the disc means is exposed below the field's surface on which the depth gauge wheels ride. Because the depth gauge wheels are pivoted in unison and because the control mechanism for this pivoting is positioned outwardly of the depth gauge wheels, the depth adjustments of the furrow opening disc means can be easily and quickly made.

BRIEF DESCRIPTION OF THE DRAWINGS

FIG. 4 is a side view of the furrow opening means and furrow forming shoe which follows it with the depth gauge wheels of the furrow opening means set at a relatively shallow depth.

FIG. 5 is a side view similar to FIG. 4 but with the depth gauge wheels of the furrow opening means set at a relatively deep depth.

FIG. 7 is a side view of the disc of the furrow opening means and the furrow forming shoe illustrating the overlapping relationship between them in the preferred embodiment.

FIG. 8 is a view taken from above FIG. 7 with the overlapping relationship between the disc of the furrow forming means and the furrow forming shoe illustrated in a cross section taken along the 8—8 of FIG. 7 and with only the remainder of the shoe otherwise shown for clarity.

DETAILED DESCRIPTION OF THE PREFERRED EMBODIMENTS

Figure 1:
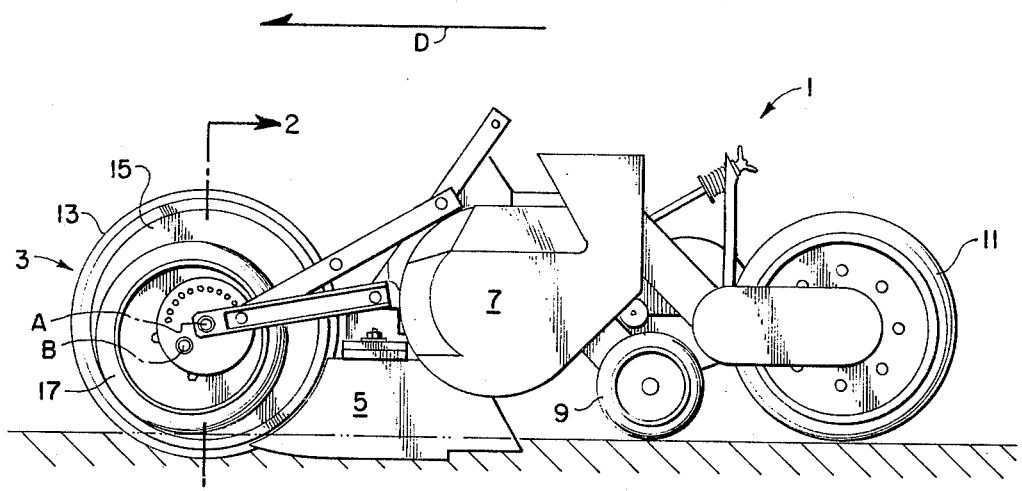
FIG. 1 is a side view of the row planter of the present invention.

As best seen in FIG. 1, the row planter 1 of the preferred embodiment of the invention includes a furrow opening means 3, furrow forming shoe 5, seed drop mechanism 7, closing wheels 9, and press wheel 11.

Figure 2:
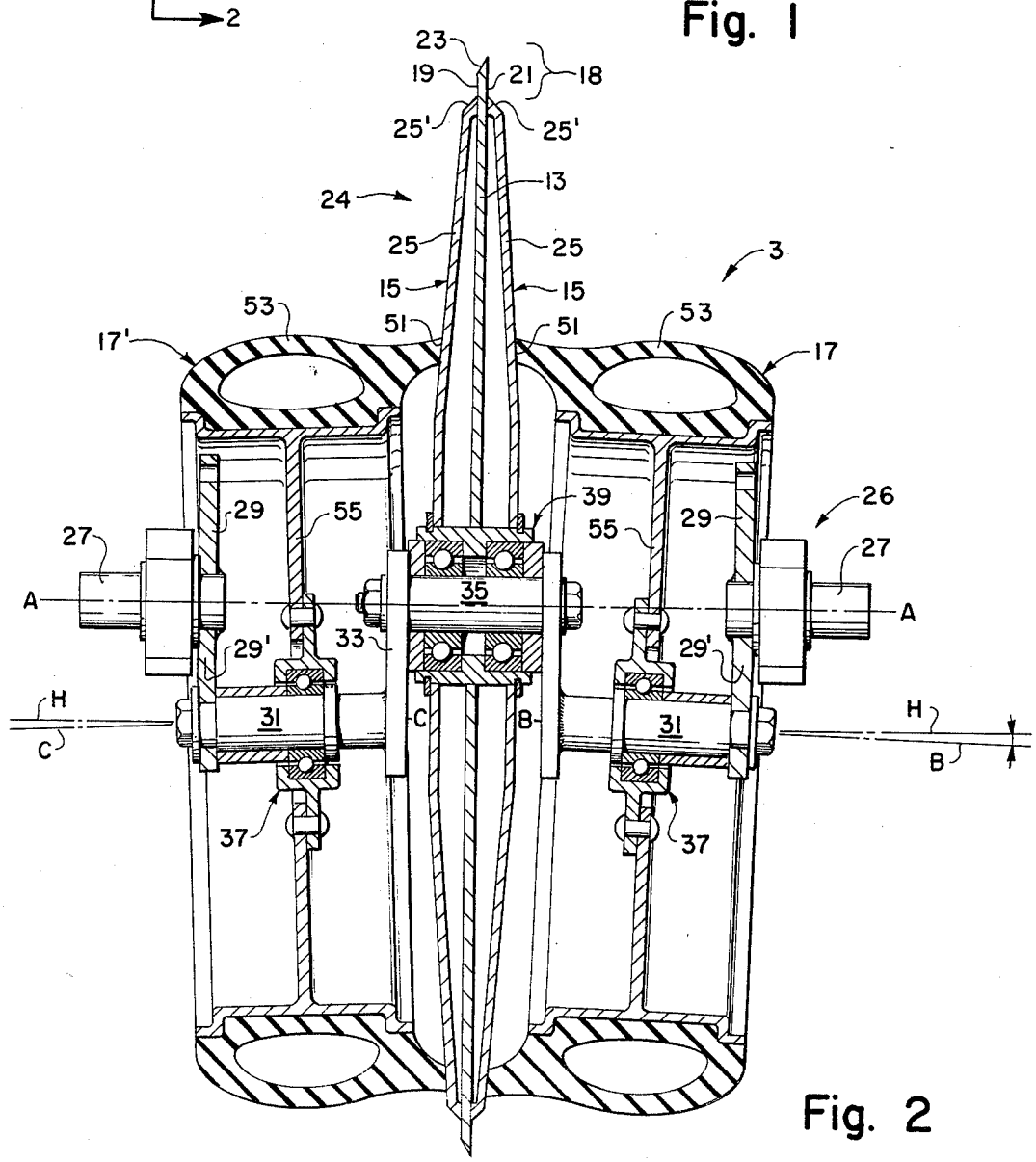
FIG. 2 is a cross-sectional view taken along line 2—2 of FIG. 1 illustrating the furrow opening means of the present invention.

The furrow opening means 3 is shown in FIGS. 1 and 2 includes a trash cutting member 13, two disc-shaped members 15 abutting the trash cutting member 13, and two depth gauge wheels 17 and 17' positioned outside of the members 15 in an abutting relationship. The trash cutting member 13 and members 15 are welded or otherwise fixed to one another to form a unitary, disc means supported for rotation about the horizontal axis A—A which is perpendicular to the direction of travel D of the row planter 1. As best seen in FIG. 2, the circular perimeter of the trash cutting member 13 extends outwardly of the axis A—A for a greater distance than the circular perimeters of members 15 wherein an annular portion 18 is formed. The annular portion 18 of the trash cutting member 13 has first and second planar surfaces 19 and 21 which are parallel to each other and generally perpendicular to axis A—A. The surface 21 of the annular portion 18 extends farther from the axis A—A than surface 19 and the annular portion 18 of the trash cutting member 13 also includes a third annular surface 23 extending between the annular surfaces 19 and 21 at an inclined angle to the axis A—A. In this manner, a unique, single bevel is formed on the periphery of the trash cutting member 13. As best seen in FIG. 2, the disc-shaped members 15 have annular surfaces 25 which diverge from one another and extend inwardly toward the common rotational axis A—A at inclined angles. The annular surfaces 25 intersect the planar surfaces 19 and 21 of the trash cutting member 13 and as shown in FIG. 2, the annular surfaces 25 are preferable bevelled at 25' where they intersect the surfaces 19 and 21. As discussed in more detail below, the preferred mode of operation of the row planter 1 is with a furrow forming shoe 5; however, if desired, the furrow opening means 3 can be used without a following shoe 5 wherein the members 15 with their diverging annular surfaces 25 actually become furrow forming means themselves. Further, the disc means 24 could be cast as a solid member if desired or the trash cutting member could be made as an integral, annular addition to one or both of the disc members 15. In this last embodiment, surface 19 and part of surface 23 of the trash cutting member 13 could be, for example, on one member 15 and the other part of surface 23 and surface 21 on the other member 15. The two members 15 with half of trash cutting member 13 on each one could then be welded together to form disc means 24. However, regardless of the manufacturing technique, the resulting disc means 24 preferably would still have the single bevel on the periphery of the trash cutting member 13 along with at least planar surface 21.

Figure 3:
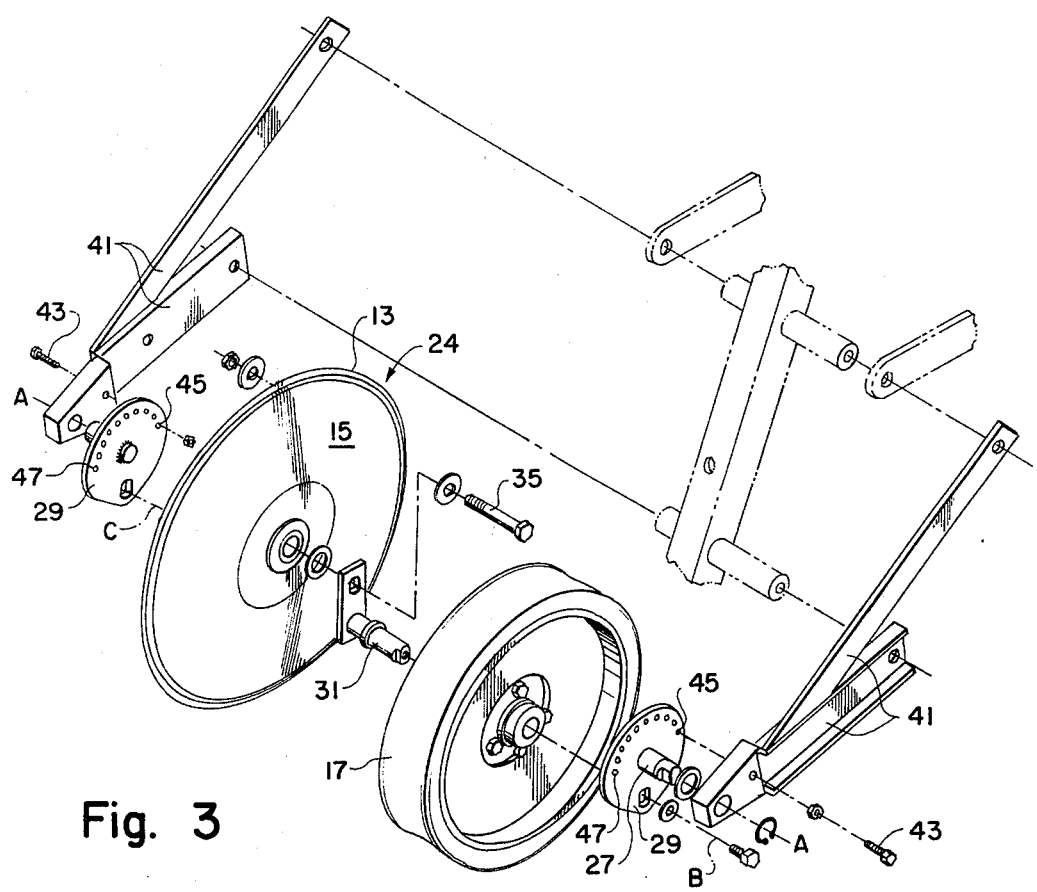
FIG. 3 is an exploded view of the furrow opening means of FIG. 2.

Referring to FIGS. 1–5, the depth gauge wheels 17 and 17' of the furrow opening means 3 are supported for rotation about respective axes B—B and C—C (see FIG. 2). Axes B—B and C—C are spaced from and fixed relative to the rotational axis A—A of the disc means 24 formed by trash cutting member 13 and members 15; and, as illustrated in FIGS. 1, 4, and 5, the disc means 24 and the depth gauge wheels 17 and 17' are all supported on a common support means 26 which includes members 27, 29, 31, 33, and 35 (see FIG. 2). The common support means 26 also includes bearings 37 and 39 for mounting the respective depth gauge wheels 17 and 17' and the disc means 26 formed by members 13 and 15 for rotation about the respective axes A—A, B—B, and C—C. As best seen in FIGS. 3-5, the common support means 26 is in turn mounted to the frame members 41 of the row planter. In operation to adjust the depth of the furrow opening means 3 between the shallow depth of FIG. 4 and the deeper depth of FIG. 5, the holding bolts 43 (see FIG. 3) are first removed from within corresponding first apertures 45 of the members 29, the entire common support means 26 is rotated about axis A—A until corresponding apertures 45 align with the bores 49 in the frame members 41 (which in turn moves the depth gauge wheels 17 and 17' and their axes B—B and C—C along predetermined arcuate paths about axis A—A), and then the holding bolts 43 are again secured within the bores 49 and apertures 47 to hold the common support means 26 in a fixed relationship relative to the frame members 41 of the row planter.

Of particular note is the fact that the common support means 26 enables the depth gauge wheels 17 and 17' to be adjusted in unison so that once the two depth gauge wheels 17 and 17' are pivoted about the axis A—A between the depths of FIGS. 4 and 5, no further adjustment to the individual depth gauge wheels is necessary. Further, because the control mechanism for rotating the common support means 26 relative to the frame members 41 of the row planter 1 is positioned outside of the depth gauge wheels 17 and 17', the depth adjustments of the furrow opening means 3 can be easily and quickly done. Also, as best seen in FIGS. 4 and 5, the shoe 5 is supported in a fixed relationship relative to the axis A—A and, therefore, the relative positioning of the shoe 5 and the unitary, disc means 24 formed by members 13 and 15 does not change even when the depth of the furrow opening 3 is varied as discussed above. Consequently, and with the single rotation of the support means 26, the row planter 1 can be immediately readied for shallow, deep, or intermediate depth planting.

Referring again to FIG. 2, the depth gauge wheels 17 and 17' of the furrow opening means 3 are mounted for rotation about respective axes B—B and C—C. These axes are spaced from and fixed relative to the rotational axis A—A of the unitary disc means 24 formed by members 13 and 15. In the preferred embodiment, the axis A—A is parallel to the horizontal axis H—H and axes B—B and C—B are preferably a few degrees off the horizontal in order that the perimeters of the free standing ends of lips 51 of the flexible tire member 53 of the depth gauge wheels 17 and 17' will everywhere abut the surfaces 25 of the members 15. This offset of axes B—B and C—C from the horizontal axis H—H and each other is accomplished by providing a slight bend at 29' in the respective members 29 of the support means 26 or milling the face end of the shafts 31 at a slight angle. The offset is necessitated by the fact that the depth gauge wheels 17 and 17' are eccentrically supported relative to the axis A—A with the peripheries of the depth gauge wheels 17 and 17' preferably within the periphery of the disc means 24. Consequently, when the free standing ends 51 abut the surfaces 25 eccentrically about axis A—A, there is a slight cant which is compensated for by the slight bend at 29' or milling the shafts 31 as discussed above. As shown in FIG. 2, the generally cylindrical shaped, flexible tire members 53 are mounted about the side member 55 of the depth gauge wheels 17 and 17'. The side members 55 extend outwardly of the respective axes B—B and C—C. When the depth gauge wheels 17 and 17' are mounted with the free standing ends 51 abutting the members 15, dirt or other matter is thus prevented from entering into the interior of the depth gauge wheels 17 and 17' between the free standing ends 51 and the sides 25 of the members 15. Were any such dirt or other matter so allowed to enter, it would inhibit and eventually stop the free rotation of the disc means 24. Another feature of the depth gauge wheels 17 and 17' is that the ground contacting, tire member 53 is made of flexible material and since the depth gauge wheels 17 and 17' are eccentrically mounted relative to the members 15, a scraping action is created between the free standing ends 51 and respective sides 25 of the members 15. This scraping action aids in keeping the members 15 free of dirt to enhance the furrow opening characteristics of the disc means 24.

Figure 6:
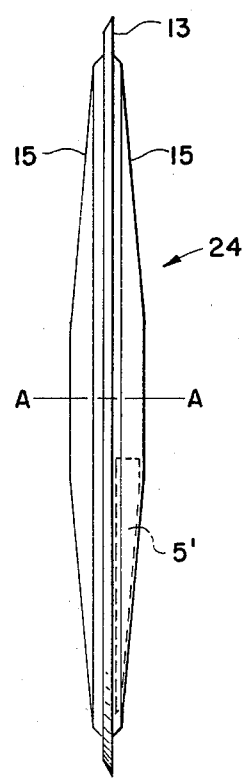
FIG. 6 is a view taken from ahead of the row planter of the present invention illustrating the manner in which the profile of the overlapping portion of the shoe falls within the profile of the disc of the furrow opening means to create a smooth transition between the two.

As best seen in FIGS. 4, 5, and 7, the shoe 5 has a peripheral portion 5' at the front end of the shoe which overlaps a peripheral portion of the disc means 24 when viewed from a direction parallel to the axis A—A. Further, as illustrated in FIG. 6, the overlapping peripheral portion 5' of the shoe 5 is proportioned and mounted so that its profile when viewed from a point ahead of the row planter falls within the profile of the disc means 24. In this manner, there is a smooth transition between the furrow opening disc means 24 and the furrow forming shoe 5. Also, in the preferred embodiment, the shoe 5 is positioned so that it is behind a vertical plane containing the horizontal axis A—A with the center of curvature of the arcuate part at 69 of the shoe 5 positioned along the axis A—A. In this manner, the center of curvature of the arcuate part 69 of the shoe 5 and the disc means 24 are the same. If desired, the centers of curvature can be different with the upper portion of the arcuate part 69 in FIG. 7 even spaced away from the disc means 24 thereby reducing the size of the overlapping portion 5' of the shoe 5.

In specific regard to the overlapping relationship of the shoe 5 and disc means 24, this offers several advantages. First, it serves to clain dirt and other matter off the side 21 of the trash cutting member 13 of the disc means 24 by the scraping action created between side 21 and the parallel side 57 of the shoe 5 (see FIGS. 7 and 8). Second, it continues to perform this cleaning function even as the trash cutting member 13 of the disc means 24 wears down and its diameter begins to diminish. Third, the overlapping relationship enables the disc means 24 and shoe 5 to be more easily and quickly aligned in their proper position by the arrangement of bolts 59 and oversized bores 61. Fourth, the overlapping relationship aids in maintaining the shoe 5 and disc means 24 in the proper alignment as the bevelled surface 23 of the trash cutting member 13 and the parallel bevelled surface 67 of the shoe 5 (see FIG. 8) create opposing forces which tend to hold the two together and in the proper alignment. More specifically, the shoe 5 has a planar member 63 which abuts against planar member 65 of the frame of the row planter 1 with the oversized bores shown as being in planar member 65. With this arrangement, the shoe 5 can be moved in a direction perpendicular to the travel direction of the row planter 1 until the surfaces 21 and 57 abut and then the shoe 5 can be backed off a predetermined amount until the disc means 24 freely rotates. Likewise, the shoe 5 can be moved relative to the disc means 24 in a direction parallel to the travel direction of the row planter 1 if it is desired to increase or decrease the amount of overlap between the shoe 5 and the disc means 24.

While several embodiments of the present invention have been described in detail herein, it is understood that various changes and modifications can be made without departing from the scope of the invention.

We claim:

1. In a row planter having a furrow opening means mounted for rotation about a horizontal axis perpendicular to the travel direction of the row planter and further having a furrow forming shoe means following said opening means, the improvement comprising:
    means for mounting said opening means and said shoe means with peripheral portions thereof overlapping when viewed from a direction substantially parallel to said horizontal axis of rotation of said opening means and wherein
    said opening means has a first profile when viewed from a point ahead of said row planter in a direction substantially parallel to said direction of travel of said row planter and said overlapping peripheral portion of said shoe means has a second profile, said second profile, when viewed from ahead of said row planter in a direction substantially parallel to said direction of travel of said row planter being smaller than said first profile, and said mounting means including means for mounting said shoe means wherein said second profile lies within said first profile when viewed from said point ahead of said row planter and wherein the remainder of said shoe means has at least a portion thereof with a third profile when viewed from said point ahead of said row planter in a direction substantially parallel to said direction of travel of said row planter with said third profile extending outwardly of said first profile and forming the final shape of the furrow.

2. The improvement of claim 1 wherein said opening means is a unitary, generally disc-shaped means.

3. The improvement of claim 1 wherein said overlapping peripheral portion of said shoe means is positioned relative to said travel direction of said row planter behind a vertical plane containing said horizontal axis of rotation of said opening means.

4. The improvement of claim 1 wherein the overlapping peripheral portion of said shoe means has an arcuate part when viewed from a direction substantially parallel to the horizontal axis of rotation of said opening means and the center of curvature of said arcuate part is substantially at a point along said horizontal axis of rotation of said opening means.

5. The improvement of claim 1 wherein said opening means is substantially disc-shaped and has an annular portion extending inwardly of the perimeter of said disc-shaped opening means toward said horizontal axis of rotation, said annular portion having first and second planar, annular surfaces spaced from each other and substantially perpendicular to said horizontal axis of rotation of said opening means, said first and second planar, annular surfaces extending outwardly of said horizontal axis for different distances and said annular portion further including a third annular surface extending between said first and second surfaces at an inclined angle to said horizontal axis of rotation of said opening means wherein said third surface forms a single bevel on the periphery of said annular portion, said overlapping peripheral portion of said shoe means having a first side substantially abutting said first side of said annular portion and a second side intersecting said first side of said shoe means at an angle and forming a bevel wherein said single bevel of said annular portion of said opening means and said bevel of said shoe means are substantially parallel.

6. The improvement of claim 1 wherein said opening means is substantially disc-shaped having first and second sides and said overlapping peripheral portion of said shoe means substantially abuts against said first side of said opening means.

7. The improvement of claim 6 wherein said opening means has a substantially circular perimeter and said first side has an annular surface extending inwardly of said perimeter to a radial location at least as close to said horizontal axis of rotation of said opening means as any part of the overlapping peripheral portion of said shoe means, said annular surface from said perimeter at least to said radial location being substantially planar and perpendicular to said axis of rotation.

8. The improvement of claim 7 wherein said overlapping peripheral portion of said shoe means substantially abutting against said first side of said opening means is a surface substantially parallel to the planar, annular surface of the first side of said opening means whereby any dirt or other matter on the planar, annular surface of said first side of said opening means will be scraped off as said planar, annular surface rotates and passes by said surface of said shoe means and any dirt and other matter will continue to be scraped off even as said opening means begins to wear and the radius of the circular perimeter thereof begins to diminish.

9. A furrow opening means primarily intended for use in combination with a row planter having a frame, said furrow opening means comprising:
disc-shaped means having first and second sides and an axis of symmetry,
first and second depth gauge wheels,
means for supporting said first and second depth gauge wheels respectively adjacent said first and second sides of said disc-shaped means, said supporting means further including means for respectively mounting said first and second depth gauge wheels for rotation about respective first and second axes and means for mounting said disc-shaped means for rotation about a third axis colinear with said axis of symmetry, said first and second axes being different from said third axis, and,
means for mounting said supporting means to the frame of said row planter, said mounting means further including means for repositioning said first and second means for mounting respectively said first and second depth gauge wheels along arcuate paths about said third axis at least between first and second positions with the center of each of said arcuate paths being substantially coincident with said third axis.

10. The furrow opening means of claim 9 wherein said first and second axes are fixed relative to each other and said means for mounting said supporting means to said frame further includes means for selectively pivoting said first and second axes in unison along arcuate paths about said third axis at least between first and second positions.

11. The furrow opening means of claim 9 wherein said depth gauge wheels and said disc-shaped means have substantially circular profiles when viewed along the respective first, second, and third axes with the circular profiles of the depth gauge wheels being smaller than said disc-shaped means and said depth gauge wheel supporting means respectively mounting each of said depth gauge wheels with the circular profiles thereof within the circular profile of said disc-shaped means and asymmetrically positioned relative to said third axis whereby the depth gauge wheels ride on the surface of a field and the depth of the opening made by said furrow opening means in said first position is different from the opening made in said second position.

12. The furrow opening means of claim 9 wherein said third axis is substantially horizontal.

13. The furrow opening means of claim 9 wherein said third axis is fixed relative to said frame.

14. The furrow opening means of claim 9 wherein said first and second axes are different from each other.

15. The furrow opening means of claim 9 wherein said first and second axes are fixed relative to each other.

16. The furrow opening means of claim 9 wherein said disc-shaped means is a unitary member.

17. The furrow opening means of claim 9 wherein said means for mounting said supporting means to said frame includes first and second means respectively positioned outwardly of said first and second depth gauge wheels and extending between said supporting means and said frame outwardly of said depth gauge wheels.

18. A furrow opening means primarily intended for use in combination with a row planter having a frame, said furrow opening means comprising:
disc-shaped means having first and second sides and an axis of symmetry,
first and second depth gauge wheels,
means for supporting said first and second depth gauge wheels respectively adjacent said first and second sides of said disc-shaped means, said supporting means further including means for respectively mounting said first and second depth gauge wheels for rotation about respective first and second axes and means for mounting said disc-shaped means for rotation about a third axis colinear with said axis of symmetry, said first and second axes being different from said third axis and said means for respectively mounting said first and second depth gauge wheels being fixed on an arc having its center on said axis of symmetry, and,
means for mounting said supporting means to the frame of said row planter including means for selectively positioning said depth gauge wheels in at least first and second positions relative to said disc-shaped means wherein said respective depth gauge wheels have a side extending outwardly of said respective first and second axes, a generally cylindrical-shaped, ground contacting portion, and means for mounting said ground contacting portion to said respective side members symmetrically about the respective first and second axes with one end of each respective cylindrical-shaped, ground contacting portion being free standing, said furrow forming means further including means for supporting said first and second depth gauge wheels respectively adjacent said first and second sides of said disc-shaped means with said respective free standing ends abutting the respective sides of said disc-shaped means along the entire perimeters of said free standing ends wherein no dirt or other matter can enter the interior of said depth gauge wheels between said free standing ends of said depth gauge wheels and said respective sides of said disc-shaped means.

19. The furrow opening means of claim 18 wherein at least said ground contacting portions of said depth gauge wheels are made of flexible material and are continuously flexed in use wherein a scraping action is created between said free standing ends and the respective sides of said disc-shaped means.

20. The furrow opening means of claim 18 wherein said third axis is fixed relative to said frame.

* * * * *